May 8, 1956     H. H. WOERDEMANN     2,745,055
LOAD AND CONTROL CURRENT FEEDBACK MAGNETIC AMPLIFIER
Filed Dec. 19, 1951     3 Sheets-Sheet 1

*INVENTOR.*
HUGO H. WOERDEMANN
BY
William R. Lane
ATTORNEY

*INVENTOR.*
HUGO H. WOERDEMANN

*INVENTOR.*
HUGO H. WOERDEMANN
BY
William L. Lane
ATTORNEY

United States Patent Office 2,745,055
Patented May 8, 1956

2,745,055

LOAD AND CONTROL CURRENT FEEDBACK MAGNETIC AMPLIFIER

Hugo H. Woerdemann, Whittier, Calif., assignor to North American Aviation, Inc.

Application December 19, 1951, Serial No. 262,425

5 Claims. (Cl. 323—89)

This invention relates to a magnetic amplifier, and particularly to an improved magnetic amplifier which utilizes induced even-order harmonics in the control and/or load windings to achieve improved amplifier characteristics.

Magnetic amplifiers are based upon the operation of a saturable reactor which has an A.-C. load winding and a D.-C. control winding. The inductance of any coil is the ratio of change of flux $\phi$ versus change of current $i$ $$L = \frac{d\phi}{di}$$

In an iron-cored coil the change of current which is needed to effect a certain flux change is dependent to a very great extent on the permeability of the iron in the coil, and to a lesser extent on the eddy currents in the iron core. Permeability ($\mu$) is, in effect, a measure of the change in relative amplitude with which the magnetic flux density in a magnetic circuit changes when the magnetizing force is changed by a fixed amount. Permeability is defined as the ratio of flux density to magnetizing force (ampere turns). Permeability is ferromagnetic materials, depending on flux density, is in general maximum at moderate and high values and quite small (approximately one) when the core is saturated. In a circuit containing a saturable reactor, therefore, in general, two regions of permeability can be distinguished: one region with very high permeability in which flux may be changed without any appreciable change in current; and another with very low permeability (saturation) in which flux can hardly be changed, even with very large amounts of currents. When this circuit is subjected to an alternating voltage and a D.-C. control voltage is applied then there will be little or no current flow during the portion of the alternating voltage cycle in which the flux change is easily effected, i. e., when the permeability is high. However, when the permeability is low, a large current flows, limited only by the resistance of the load in the circuit if $\mu = 1$, as is the case for modern material.

The saturable core reactor is designed, generally, with a D.-C. control winding, a bias winding, and an A.-C. load winding. It is normally designed so that with no voltage applied to the D.-C. control winding the reactor remains unsaturated during the complete supply voltage cycle of the magnetizing current, thus effectively limiting the alternating of the magnetizing current to a small value. With an increased direct voltage across the control winding, however, the core becomes saturated during part of the supply cycle and consequently, since permeability ($\mu$) is low at saturation, the instantaneous value of the alternating current in the load windings increases during this part of the supply cycle, allowing more A.-C. power to be dissipated in the load. When the core saturates, a control current also flows; and if the control current alone is relied upon to maintain the necessary saturation until a supply half-cycle is completed, a prohibitively large current must be supplied for control purposes. In the past, therefore, it has become common practice to utilize current flowing in the load windings to maintain saturation as required. One such method has been to rectify a part or all of the current flowing in one or more of the load windings and utilize it to produce the necessary saturation or a part thereof. The extent to which the load current is used to produce saturation of the cores is termed "natural magnetization" as distinguished from that known as "forced magnetization" when the control source current is relied upon to produce saturation. In a common magnetic amplifier, two saturable core reactors are employed, each having a load winding and a control winding. The A.-C. load current is caused to flow unidirectionally through the load winding of each core by the use of rectifiers relatively arranged to allow load current to pass in one direction in the load winding of one of the cores, and in the other direction in the winding on the other core. Such a circuit has been called a feedback circuit, or a 100% load current feedback current, the implication being that the load current supplies all the necessary ampere turns for providing saturation. The distinction should be made, however, that even in this improved device a control winding must supply a considerable current, since the load current cannot be changed without ampere turns being supplied by the control winding. Only by use of magnetic materials having a shape of the B-H curve given by $$\frac{dB}{dH} = \text{infinity}$$

which also requires that no eddy currents are induced in the core, would no further control ampere turns be required to change the load current from zero to full scale with a change of control voltage only. The best presently available magnetic core materials have a B-H curve slope of less than $10^5$ at power line frequencies. In addition, even with such an ideal magnetic material, control current would still be needed to change the magnitude of the load current because the rectifiers usually possess a finite back resistance, and the desaturation influence of the reverse current or leakage current of these rectifiers is as large or larger than the control ampere turns needed for the best magnetic materials. Consequently, a very large input control current is needed to control the amplifier output, i. e., the amplifier has an inherent low input impedance. Further, the amplifier has a certain inherent response time, and if power gain is increased, the response time of the amplifier is also increased.

It is therefore an object of this invention to provide a magnetic amplifier in which the ampere turns gain becomes virtually infinite.

It is another object of this invention to provide a magnetic amplifier in which the time constant of the amplifier can be reduced to a very small value.

It is another object of this invention to provide a magnetic amplifier in which required signal control current is reduced to a minimum.

It is another object of this invention to provide a magnetic amplifier which is the equivalent of a voltage amplifier.

It is another object of this invention to provide an improved magnetic amplifier.

It is another object of this invention to provide a magnetic amplifier in which the effect of load rectifier back currents is automatically compensated.

It is another object of this invention to provide a magnetic amplifier in which the induced even-order harmonic currents flowing in one or more of the windings thereof are utilized to produce saturation of the saturable core reactors.

It is another object of this invention to provide a magnetic amplifier in which all alternating currents flowing in the saturable reactor windings thereof are rectified to the greatest possible extent to aid in saturation of the magnetic core materials thereof.

Other objects of invention will become apparent from the following description taken in connection with the accompanying drawings, in which.

Figure 1:
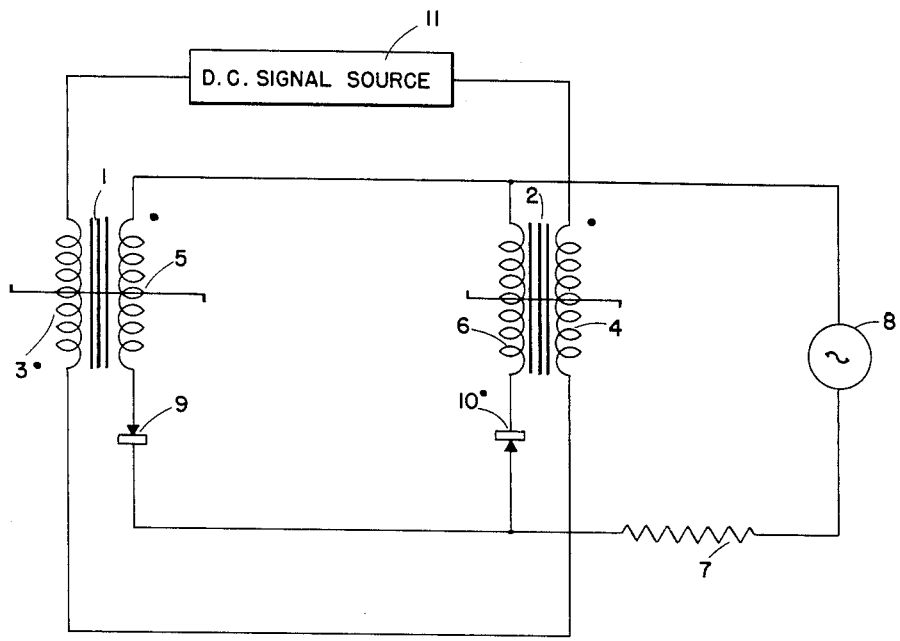
Fig. 1 is a conventional load current feedback magnetic amplifier.

Referring now to Fig. 1, there is shown a conventional load current feedback magnetic amplifier. In this magnetic amplifier two saturable core reactors 1 and 2 are provided with control windings 3 and 4, respectively, and load windings 5 and 6, respectively. A load represented by resistance 7 is connected in series with a source 8 of alternating current, and the two windings are placed in parallel, each in series with rectifiers 9 and 10, respectively. A direct current signal source 11 completes the circuit. This signal source is biased so that when the control signal is zero, the load current is very small. This bias may be supplied by an additional balanced winding on each saturable reactor or by a steady direct current supplied to the signal source. As the signal from source 11 is increased, increasing current is supplied through control windings 3 and 4. A large current flows in load windings 5 and 6 which are arranged by virtue of rectifiers 9 and 10 to carry current only in one direction. Since these windings carry current in only one direction, they tend to saturate the core material in aid of the control windings 3 and 4. The current required to be supplied by source 11 is therefore less than would be required if control windings 3 and 4 had to supply the entire saturation. Saturable reactors in magnetic amplifiers are all connected in such a manner that the fundamental frequency of the line power is bucked out in the control winding. Otherwise there would be large A.-C. voltages and current flow in the control circuit. Thus, in Fig. 1, control windings 3 and 4 are so arranged that the fundamental frequency of alternating current source 8 induced in these windings is bucked out. However, as soon as saturation occurs during part of the supply cycle, harmonics of the fundamental frequency will be induced in the control windings. With even-order harmonics flowing therein control windings 3 and 4 aid each other instead of bucking so that even-order harmonic currents will flow in the control windings. However, in the magnetic amplifier shown in Fig. 1, the only feedback produced to aid saturation of the core material is that due to rectification of the odd harmonics of the fundamental frequency of the line power. Thus, in Fig. 1, the currents flowing in load windings 5 and 6, which are useful in producing saturation of reactors 1 and 2, are only the odd harmonics as rectified by rectifiers 9 and 10. As previously pointed out, generally, however, a disadvantage of this circuit is that a relatively large current must be supplied by source 11 in spite of the provision of feedback through the load windings in order to achieve a change in load current.

Figure 2:
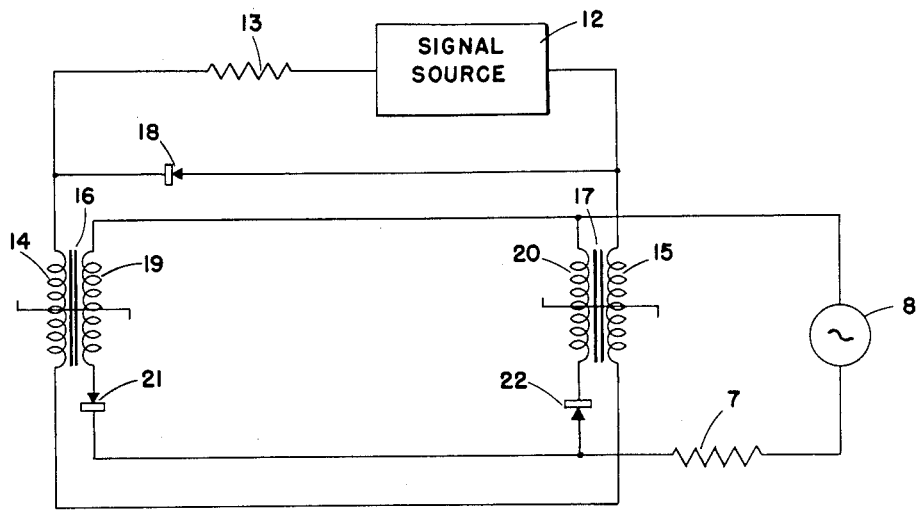
Fig. 2 is a circuit diagram of the magnetic amplifier of this invention.

Turning now to Fig. 2, the improved magnetic amplifier of this invention is shown. A signal source 12 is connected in series with an impedance 13 and is then connected to the control windings 14 and 15 of two saturable core reactors 16 and 17. Control windings 14 and 15 are connected so that the currents induced in them by load currents are in the same direction, that is, the control windings are in series addition. Rectifier 18 is connected in parallel with the signal source as shown. Load windings 19 and 20 with rectifiers 21 and 22 are connected in parallel for the purpose of producing unidirectional current only in the load windings. Again, a source of alternating current 8 and a load 7 are connected as shown.

Operation of the invention can be best understood by reference to Fig. 2 and a comparison thereof with Fig. 1. In the embodiment of the invention shown in Fig. 2, the even harmonics of the fundamental line power frequency flowing in the control windings are rectified by rectifier 18 and used to aid saturation of the saturable core reactors. Since impedance 13 is provided between the control windings and the signal source 12 in the device shown in Fig. 2, almost negligible even harmonic current flows therethrough. Rectifier 18 is a half-wave rectifier which rectifies the even harmonic currents flowing through the control windings and thus provides a direct current which aids saturation and provides feedback. Thus, there is direct current flowing through load windings 19 and 20 which is the rectified fundamental and odd harmonic component of the line power, and a direct current derived from the even harmonic of the line power frequency flows in the control winding to aid saturation. A magnetic amplifier is therefore provided which may more accurately be termed a 100% feedback magnetic amplifier than can the device shown in Fig. 1, since feedback due both to the odd and even harmonics is utilized. Further, since impedance 13 is provided, not only is little or no current required to flow from the signal source 12, but little or no current is actually permitted to flow therethrough.

Figure 3:
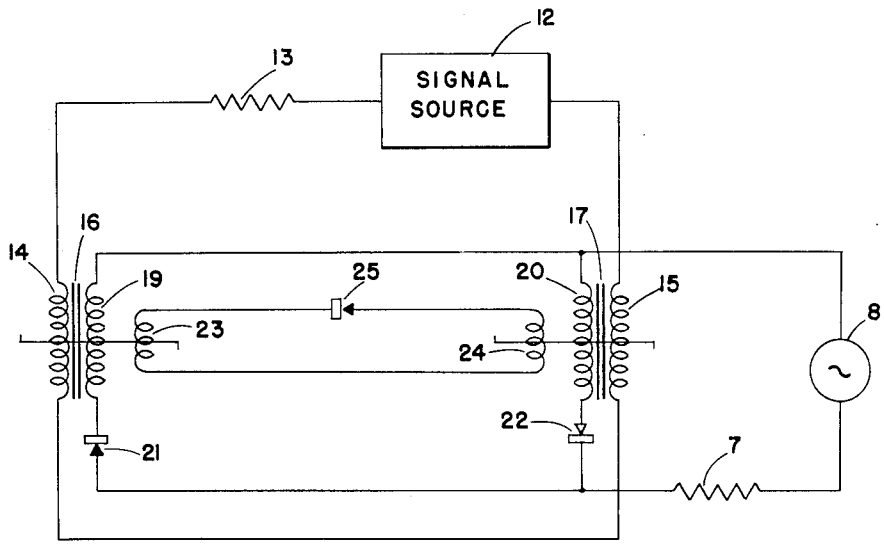
Fig. 3 is a circuit diagram of a second embodiment of the device of this invention.

Turning now to the embodiment of the device shown in Fig. 3, there is shown an arrangement identical in all its parts to that shown in Fig. 2, except that insead of using the control windings to which the control signal is applied for circulating currents due to second harmonics, auxiliary control windings 23 and 24 are provided along with rectifier 25. In this device, induced second harmonic current in windings 23 and 24 is rectified by means of rectifier 25 and is provided to aid saturation in the same manner as in the device shown in Fig. 2. The advantage of this embodiment of the invention is that the number of turns in windings 23 and 24 may be chosen so that the current and voltage therein will match the characteristics of rectifier 25, and the number of turns in windings 14 and 15 may be selected independently for desired input and amplification characteristics, the ampere turns necessary for saturation being generated automatically by a current change to compensate for a change in the number of turns.

As was previously noted, the embodiments of the invention so far disclosed have provided only half-wave rectification of the induced currents flowing either in the control windings connected to the signal source, or separate auxiliary control windings added specifically for feedback of the second harmonic currents. In these embodiments of the invention, feedback approaches but never exceeds 100%. In the embodiment of the device shown in Fig. 4, however, full-wave rectification of induced second harmonic currents is achieved with the result that in excess of 100% control current feedback may be achieved.

Figure 4:
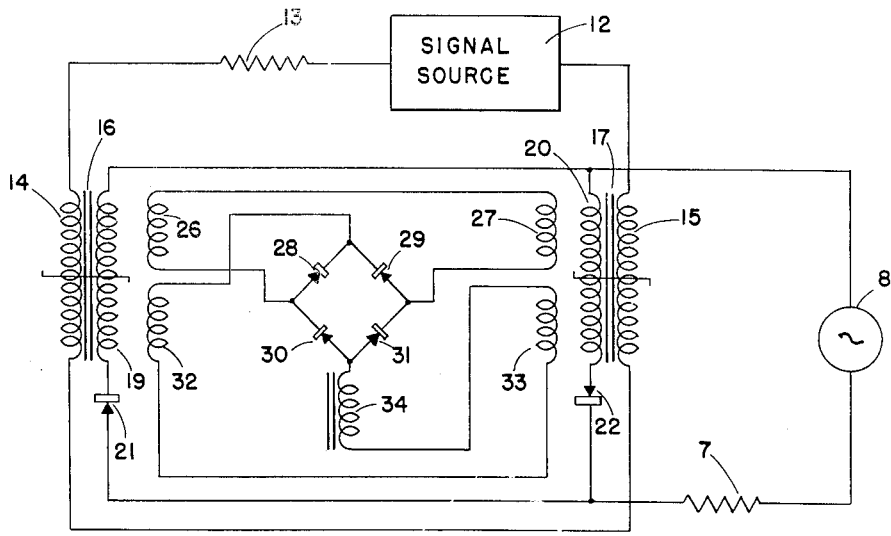
Fig. 4 is a circuit diagram of a third embodiment of this invention.

Referring now to Fig. 4, there is shown a magnetic amplifier generally the same as that shown in Fig. 3 except that a second auxiliary winding is provided, together with other components to achieve full-wave rectification of the second harmonic currents. In Fig. 4, feedback windings 26 and 27 have induced in them the even harmonics which need to be rectified to aid saturation. These windings are connected to rectifiers 28, 29, 30, and 31 as shown, to provide full-wave rectification. Thus, there is applied to feedback windings 32 and 33 a direct current which is a function of the even harmonics induced in windings 26 and 27. However, since windings 32 and 33 are wound on the same cores as the other windings, there would normally be induced in them alternating currents. To retard alternating current without stopping direct current in windings 32 and 33, choke 34 is connected in series with the windings. By a judicious choice of the number of turns in the various windings shown in the embodiment of the invention disclosed in Fig. 4, feedback greater or less than 100% may be achieved. As before, impedance 13 is provided to prevent current flow through signal source 12.

Thus far, embodiments of the invention have been disclosed wherein even harmonics flowing in either the control windings or in separate auxiliary windings have been utilized by rectification to aid saturation and reduce current from the signal source. It is possible, however, also to utilize induced second harmonic currents in the load windings themselves to aid in producing saturation.

Figure 5:
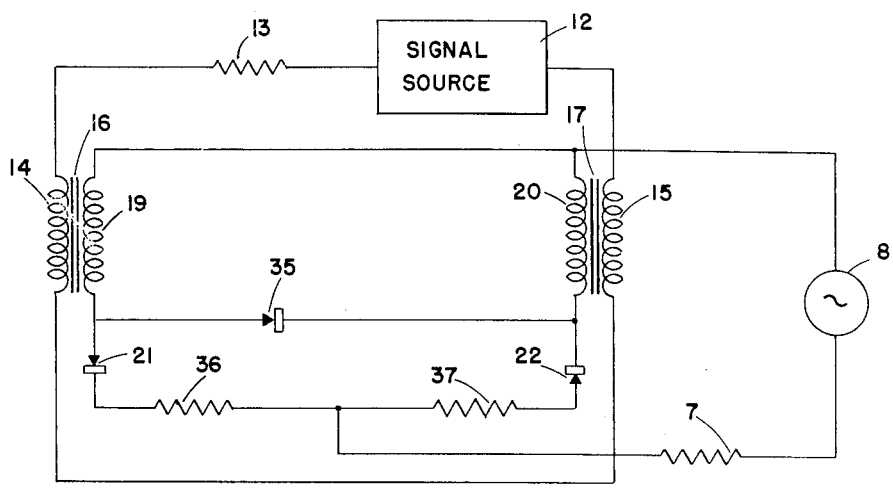
Fig. 5 is a circuit diagram of a fourth embodiment of this invention.

Referring now to Fig. 5, there is shown a magnetic amplifier generally similar to that shown in Fig. 2 but modified to utilize induced second harmonic currents in the load windings to aid saturation. In Fig. 5, even harmonic currents flowing in load windings 19 and 20 are rectified by rectifier 35 and are used to aid saturation of reactors 16 and 17. Since load windings 19 and 20 are connected so that the even harmonic voltages are bucking, the windings will be in series for even harmonic current circulation. Rectifier 35 is used to rectify this circulating even harmonic current to produce A.-C. control current feedback. Resistances 36 and 37 may be provided to increase the impedance for even harmonics in the load path, and impedance 13 is provided in the control circuit. Resistances 36 and 37 may also be provided for circuits shown in Figs. 2, 3, and 4, if needed, to raise the impedance of the load circuit such that most even harmonics are caused to flow wherever the second harmonic feedback rectification is placed.

Figure 6:
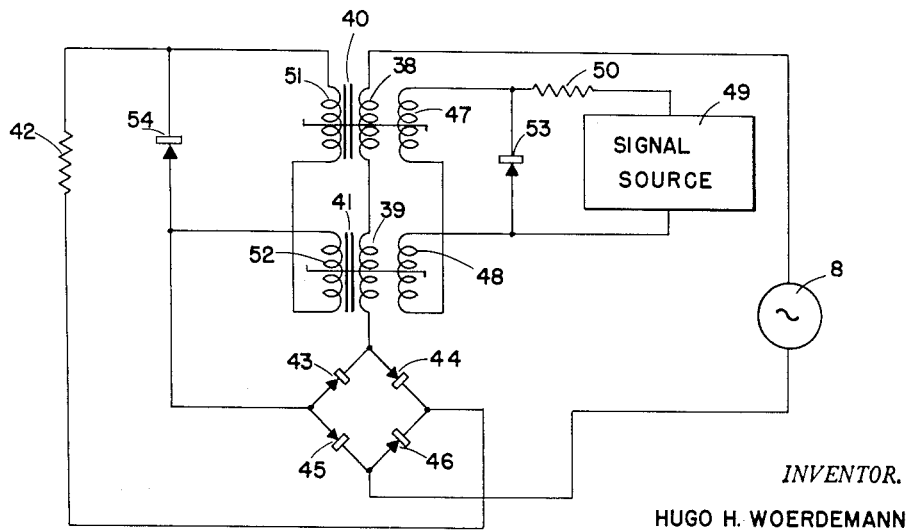
Fig. 6 is a circuit diagram of a fifth embodiment of this invention.

In the embodiments of the invention thus far disclosed, the load windings of the saturable reactors used have been connected in parallel. That it is possible to utilize second harmonic current feedback to aid in saturation when the two saturable reactors are connected in series is demonstrated by the embodiment of the invention shown in Fig. 6. In all the previous embodiments the current applied to load 7 was an alternating current. In the embodiment of the invention shown in Fig. 6, however, only direct current is applied to the load. In Fig. 6, as in the previous embodiments, line power is derived from an alternating current source 8 and is applied to load windings 38 and 39 of saturable reactors 40 and 41, and thence to load 42 through rectifiers 43, 44, 45, and 46—load current flowing through rectifier 46, load 42, external feedback windings 51 and 52, rectifier 43, and the load windings during one half cycle; through the load windings, rectifier 44, load 42, feedback windings 51 and 52, and rectifier 45 the other half cycle. Control windings 47 and 48 are connected to signal source 49 through impedance 50, as shown. External feedback windings 51 and 52 are connected in series with load 42. To rectify the even harmonics induced in order to aid saturation, rectifier 53 or rectifier 54 may be provided, connected as shown in Fig. 6. If rectifier 53 is connected as shown in Fig. 6, the second harmonics induced in windings 51 and 52 are utilized to aid saturation.

Thus, it has been shown that even-order harmonics induced either in the load or control windings or in an external feedback or auxiliary winding may be utilized to aid in saturation and thus reduce signal source current—either with the saturable reactors of the magnetic amplifier stage connected in parallel, or in series. Previously known magnetic amplifier feedback schemes have utilized only the odd harmonic current that is generated to produce direct current which aids saturation. However, complete current feedback to eliminate control current can be obtained only if all the even and odd harmonic current thus generated is rectified and allowed to flow in the windings where it was generated. In this invention the control current which is needed to vary the load current from zero to full value is no longer supplied by the signal source, but is supplied from the line power. The control current feedback circuit also provides ampere turns to oppose the demagnetizing ampere turns caused by the leakage current of the rectifiers. The power gain, which for the circuit of Fig. 1 is the ratio of load power to signal power, becomes virtually meaningless when applied to this invention, because in this invention only signal voltage is required. This statement needs to be qualified only to the same extent as in a conventional vacuum tube voltage amplifier, wherein the flow of current in the grid circuit, though present, is negligible. The magnetic amplifier herein disclosed embodies complete self-feedback, both 100% load and 100% control feedback, and the power taken from the signal source is negligible regardless of the power consumption of the load.

The speed of response of the magnetic amplifier of this invention, for a given power gain, is very greatly increased because of the rectification of circulating alternating currents of even harmonic order. In addition, since the even-order harmonic currents rectified to aid saturation in this invention are directly related to leakage or back current of the load rectifiers, the effect of these back currents is automatically nullified. If these back currents vary with temperature, as they do with presently available rectifiers, the effect of temperature variation is compensated by corresponding variation in feedback for aiding saturation. This is true because the greater the rectifier back currents are, the greater the flow of even harmonic currents to be rectified. By eliminating the effect of these back currents, cheaper and less efficient rectifiers may be used in the amplifier.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a magnetic amplifier, a plurality of load and control windings, said load windings inductively coupled to said control windings and relatively disposed with respect to said control windings so as to induce series aiding currents in said control windings and thus induce even harmonic currents in said control windings and inductively buck out fundamental and odd harmonic power source currents induced in said control windings, a load, a power source connected to furnish power to said load windings and said load, a signal source connected to furnish input signals to said magnetic amplifier, and a rectifier connected in circuit with said control winding and poled in a direction to permit circulation of said induced series aiding currents in said control windings.

2. In a combination including saturable reactors having load and control windings, said load windings being connected in parallel, a respective rectifier connected in circuit with each of said load windings directed to permit current flow in opposite directions in said load windings, a load, a power source connected in series with said load and said load windings, said control windings connected in series addition and inductively related to said load windings in polarity so that even harmonic currents are induced in said control windings, rectifier means in circuit with said control windings, said rectifier means poled in a direction whereby free circulation of second harmonic current is permitted in said control windings, and a signal source connected to said magnetic amplifier.

3. In combination, two saturable reactors each having a load winding and a corresponding control winding inductively associated with each said load winding, a diode in series with the load winding of each reactor, each said series-connected load winding and diode being connected in parallel with the other said load winding and diode, and each diode oppositely disposed whereby current is allowed to flow in one direction through one load winding and in the opposite direction through the other, said control windings being connected in series addition, and a third diode shunted across said series-connected control windings, said third diode poled in a direction to allow circulation of even harmonic currents induced in said control windings.

4. In a magnetic amplifier, a load, a source of alternating current, a plurality of separately disposed load windings connected to said load and said source of alternating current, rectifying means in circuit with said load windings, at least one control winding inductively related to said load windings in a direction so that the induced currents in said control winding are in series addition, said load windings being disposed relative to said control winding so as to buck out currents of fundamental frequency of the source and induce currents of even harmonic frequency therein, rectifier means disposed in series with said control winding and poled in a direction to allow circulation of the currents induced in said control windings.

5. A magnetic amplifier comprising a pair of saturable reactors each having a load winding and a control winding, rectifying means connected to said load windings allowing unidirectional current flow therein, a source of alternating current connected to said load windings, said control windings connected in series addition and inductively disposed relative to said load windings so that even harmonic currents are induced in said control windings, and rectifying means in series with said control windings said rectifying means poled in a direction to allow flow of the currents induced in said control windings.

References Cited in the file of this patent

UNITED STATES PATENTS

| | | |
|---|---|---|
| 1,739,579 | Dowling | Dec. 17, 1929 |
| 1,812,202 | Dowling | June 30, 1931 |
| 2,126,790 | Logan | Aug. 16, 1938 |
| 2,259,647 | Logan | Oct. 21, 1941 |
| 2,365,611 | White | Dec. 19, 1944 |
| 2,594,372 | Wattenberger | Apr. 29, 1952 |